Figure 1:
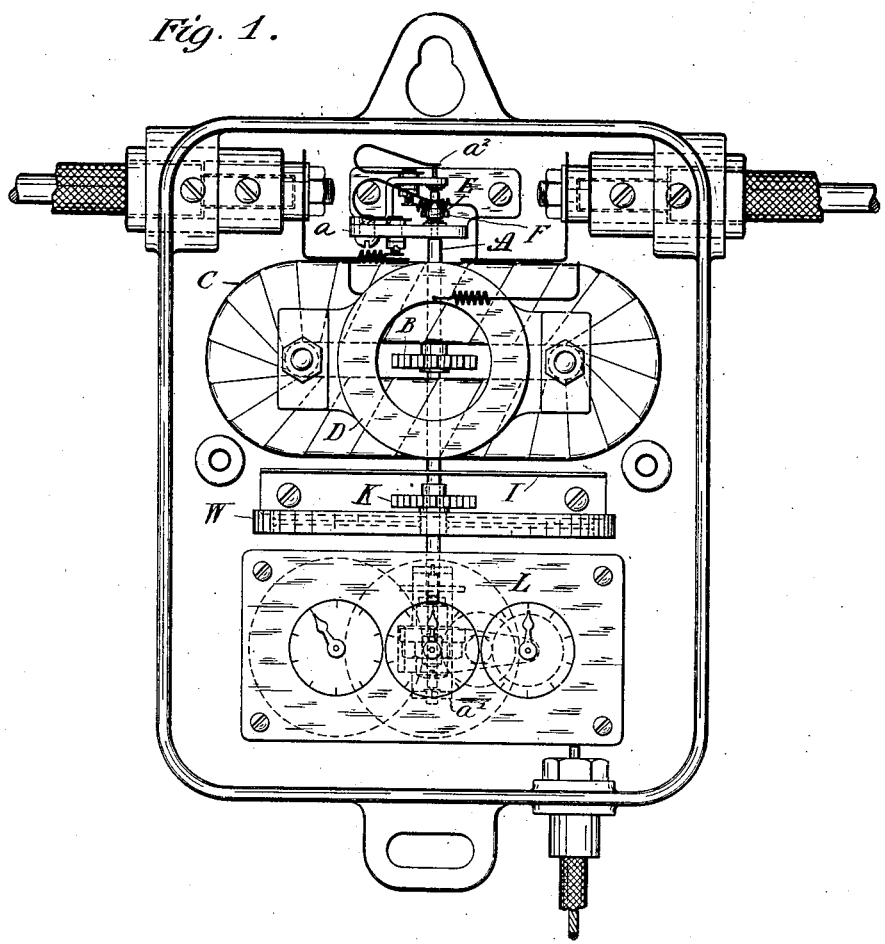

No. 762,358. PATENTED JUNE 14, 1904.
W. STANLEY.
ELECTRIC METER.
APPLICATION FILED DEC. 6, 1901. RENEWED JAN. 11, 1904.
NO MODEL. 4 SHEETS—SHEET 1.

WITNESSES:
Frank S. Ober
Rob S. Allyn

INVENTOR:—
William Stanley,
BY
R. Cutcheo
ATTORNEY

No. 762,358. PATENTED JUNE 14, 1904.
W. STANLEY.
ELECTRIC METER.
APPLICATION FILED DEC. 6, 1901. RENEWED JAN. 11, 1904.
NO MODEL. 4 SHEETS—SHEET 3.

WITNESSES: INVENTOR:—
William Stanley,
BY
ATTORNEY

No. 762,358. PATENTED JUNE 14, 1904.
W. STANLEY.
ELECTRIC METER.
APPLICATION FILED DEC. 6, 1901. RENEWED JAN. 11, 1904.
NO MODEL. 4 SHEETS—SHEET 4.

WITNESSES: INVENTOR.—
William Stanley,
BY
ATTORNEY

No. 762,358. Patented June 14, 1904.

UNITED STATES PATENT OFFICE.

WILLIAM STANLEY, OF GREAT BARRINGTON, MASSACHUSETTS, ASSIGNOR TO STANLEY INSTRUMENT COMPANY, OF GREAT BARRINGTON, MASSACHUSETTS, A CORPORATION OF MASSACHUSETTS.

ELECTRIC METER.

SPECIFICATION forming part of Letters Patent No. 762,358, dated June 14, 1904.

Application filed December 6, 1901. Renewed January 11, 1904. Serial No. 188,664. (No model.)

*To all whom it may concern:*

Be it known that I, WILLIAM STANLEY, a citizen of the United States, residing at Great Barrington, Berkshire county, State of Massachusetts, have invented certain new and useful Improvements in Electric Meters, of which the following is a full, clear, and exact description.

My invention relates to electric meters, and has for its object to produce a simple and efficient meter of the oscillating type in which the record of the number of oscillations shall indicate the current that has passed to the translating devices.

The operation of my meter is based on the following considerations, viz: If a piece of iron is pivoted to rotate about a central line at right angles to its greatest lineal dimension and is placed in a magnetic field, it will oscillate to and fro across the field, and finally come to rest with its greatest dimension parallel to the field surrounding it—as, for instance, in the operation of a compass-needle. If the frictional resistance retarding the oscillation is small and the inertia of the moving system is great, the time of angular oscillation will be inversely proportional to the field in which the oscillation takes place. Again, if there were no friction retarding the system tending to reduce the amplitude of the oscillations such a needle surrounded by a magnetic field would if once started forever oscillate with a frequency $T = \frac{1}{F}$, where T equals time of an oscillation and F equals the number of lines of magnetic force at right angles to its axis. It is impossible, of course, to construct a moving mechanical system free from friction; but the friction being once known one can supply periodically (during an oscillation) a torque or turning effect of such a value that each impulse will furnish just enough of a turning effort to balance the retarding effect of the rotational friction, and so leave the moving system free to oscillate, as described above. If, then, a device is provided to record the number of oscillations taking place, such a record will truly indicate the strength of field, determining the time of oscillation of the armature, and consequently the strength of current producing such field.

The following is a description of a meter embodying my invention and operating in accordance with the considerations above referred to, reference being had to the accompanying drawings, in which—

Figure 2:
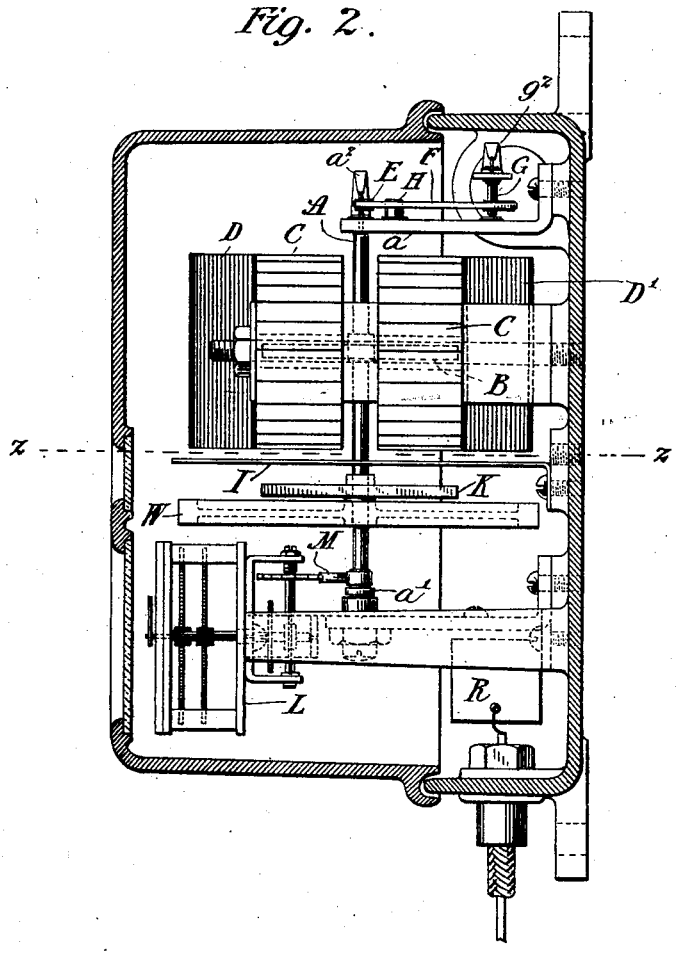
Figure 3:
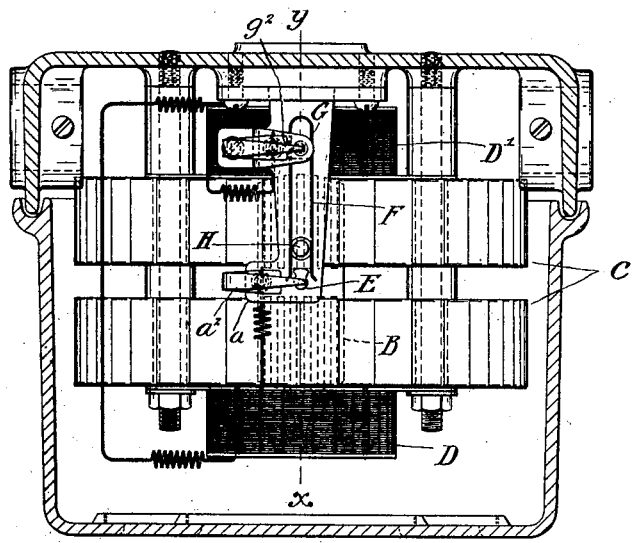
Figure 4:
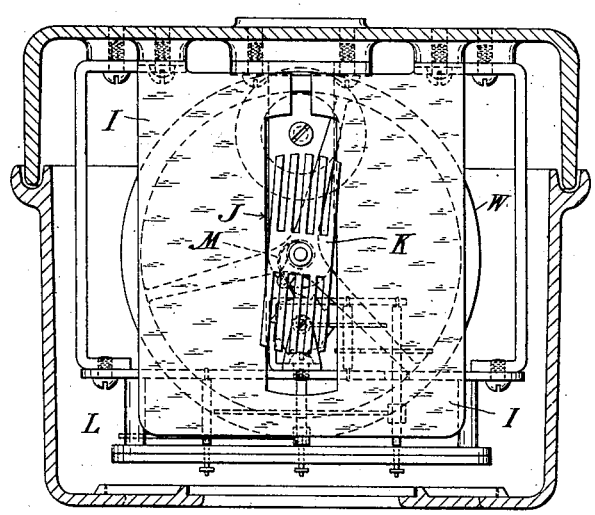
Figure 5:
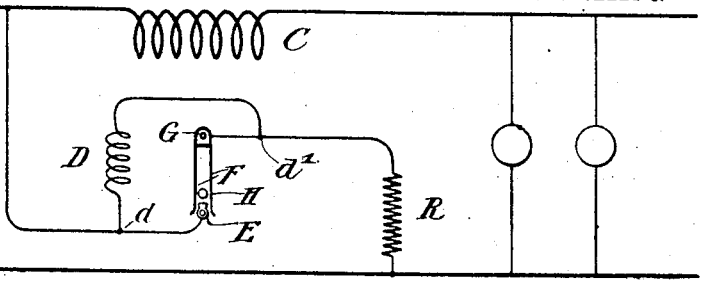

Figure 1 is a front view of the meter embodying my invention. Fig. 2 is a side elevation of the same. Fig. 3 is a plan view. Fig. 4 is a plan view of parts below the line $z\ z$. Fig. 5 is a diagrammatic view of circuits, and Fig. 6 is a diagrammatic view of the coils and needle.

Referring more particularly to the drawings, it will be seen that a shaft or staff A is suitably pivoted in bearings $a\ a'$ and electrically connected to one of the mains by the spring-contact $a^2$. Fixed on this shaft is an armature or needle of magnetic material B. A coil of wire or ribbon C surrounds the needle and when traversed by a current produces a field of the direction $x\ y$. A second coil D or pair of coils D D', wound of fine wire and considerable resistance, is placed adjacent to coils C and in like relations to the needle B. These are connected in series with a resistance R and are attached to the mains of a system, forming a derived or shunt circuit across the mains. Near one extremity of the staff A is a cam E and a forked spring F, electrically connected by spring-contacts $a^2$ and $g^2$ through the staff A and a staff G, respectively, to the extremities $d\ d'$ of the coil D. The cam and spring-fork are so related that when the staff A is turned through an angle on either side of the zero-line (see Fig. 6) the cam comes in contact with the spring-fork and closes a short circuit about the coil D, offering a path of comparatively low resistance to the current supplied to D and (during the time the cam and fork are in contact) completely shunting the current from the coil D through the low-resistance shunt. If now the needle or armature is set in oscillation by a current traversing the coil C or otherwise, then in each half-oscillation a current will traverse the coil D, impressing another magnetic field during the time or part of the time that the needle is accelerating in speed in both directions of motion and will be shunted around the coil D at all other times. The field impressed by the current in the coil D being due to a shunt-current is practically independent of variations in the load—as, for example, if the cam and fork are as shown in Fig. 6 then during the time the needle is turning from twenty degrees to five degrees toward the center line 1 1 in both directions the cam E will not be in contact with the fork F and current will pass through the coil D, while at all other times current will be shunted through the cam and fork, &c., and no current will flow through the coil. From this it results, therefore, that during each half-oscillation of the needle a current impulse which is independent of variations in the load will assist and accelerate the speed of oscillation of the needle and will consequently add to its energy of motion. By proportioning the strength of this impulse or torque so as to balance the retarding effect of friction occurring throughout each half-oscillation one can completely remove the effects of friction from the device, leaving it free to oscillate in times controlled by the field produced by the coil C—that is to say, the field corresponding to the strength of the current to be measured.

Figure 6:
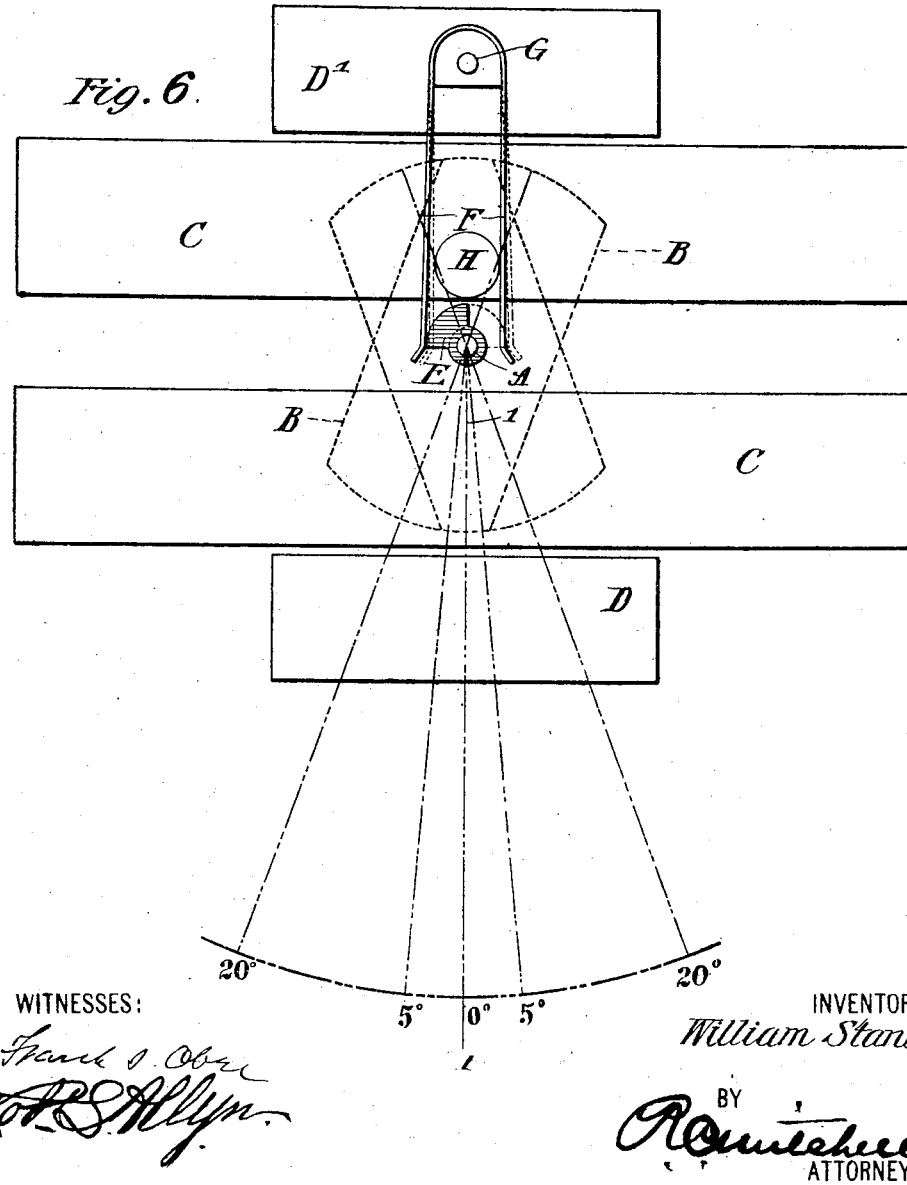

The cam E and spring-fork F are shown on an enlarged scale in Fig. 6. The spring-fork F is pivoted at G, so as to be free to move slightly under the action of the cam E. This movement is limited by the stop H, consisting of an insulated post placed between the two members of the fork. It will be seen that the cam and fork establish a short circuit around the coil D at all times except when the cam is moving from one member of the fork to the other and that since the fork is slightly displaced by the cam the time when the coil D is not short-circuited, and is therefore acting to give the bar or needle B an impulse, is as the needle is approaching the medial position or as it is moving through the arc twenty degrees to five degrees. In order that the oscillations due to the field of the coils C may be slow, I apply to the shaft A a balance-wheel W, such as to make the inertia of the moving system relatively great. In case the meter is used to measure alternating currents the resistance R should be non-inductive.

It is to be noted that if for any reason, such as turning off all the lamps or other translating devices, the bar B should stop oscillating and happen to come to rest, so as to be parallel with the field of the coil C, there would be a failure to start when the current was again turned on. In order to remedy this, I provide an iron plate I, attached to the meter-base and having a longitudinal slot J. I also provide a small and quite feeble bar-magnet K slightly shorter than the slot J. This is mounted on the shaft A at a slight angle to the needle B. If now the current in the coils C ceases, the magnet K will act to pull the needle B out of parallelism with the field of the coil C, so that when the current comes on again the device will start. The magnet K introduces no disturbing forces into the meter, since the effects of the attractions upon the sides of the slot J cancel out.

The oscillations of the shaft A with its bar B are integrated by the registering-train L, which is operated by the pawl M, mounted on the shaft A. Since the number of oscillations is proportional to the current flowing, the indications of the registering-dial will indicate the amount of current that has passed to the translating devices.

What I claim is—

1. In a meter in combination, a coil producing a field proportional to the current to be measured, an oscillating needle in said field and means for increasing said field by an amount independent of variations in the load while said needle is approaching the medial line of its oscillation.

2. In a meter, a coil in series with the translating devices, an oscillating needle within the influence of said coil, an auxiliary coil in shunt to said devices and means for energizing said coil while the needle is approaching the medial line of its oscillation and deënergizing it at other times.

3. In a meter, the combination of means for producing a magnetic field proportional to the current to be measured, a needle mounted free to oscillate within said field, and means for periodically impressing a second field by an amount independent of variations in the load to accelerate the motion of said needle and producing a torque substantially equal to the retarding effect due to the frictional resistance.

4. In an oscillating meter the combination of means for producing a magnetic field, a needle oscillating therein and magnetized means for preventing the needle coming to rest in a position parallel to the lines of force of said field.

5. A shaft having a position in which it may become locked, in combination with the plate I and the magnet K.

6. In a meter in combination, the oscillating needle B, coil C in series with the translating devices, coil D in shunt thereto, and means for periodically energizing the coil D while the needle B is approaching the medial line of its oscillation.

7. In a meter in combination, the oscillating needle B, coil C in series with the translating devices, coil D in shunt thereto, cam E and fork F controlling the current through said coil D.

8. In a meter an oscillating needle in a magnetic field and means for impressing a magnetic impulse upon said needle during it period of acceleration, equal to the retarding effect of friction and independent of the load measured.

9. In combination in a meter, a coil in series with the load, a coil in shunt to said load, a high resistance in series with said shunt-coil and means for automatically opening and closing a low-resistance shunt around said shunt-coil.

Signed at Great Barrington, Massachusetts, this 4th day of December, 1901.

WILLIAM STANLEY.

Witnesses:
　Wm. H. Browne,
　F. A. Remington.